(12) United States Patent
Cook, Jr. et al.

(10) Patent No.: US 6,441,363 B1
(45) Date of Patent: Aug. 27, 2002

(54) VEHICLE OCCUPANT SENSING SYSTEM

(75) Inventors: Charles R. Cook, Jr., Rochester Hills, MI (US); Dan O'Rourke, Auburn Hills, MI (US); Jeff Clark, Sterling Hghts., MI (US); Alanna Quail, Oakland Township, MI (US); Paul Witt, St. Charles, IL (US); Hubert Braunwarth, Friedberg (DE); Mark Clark, Clarkston, MI (US); Dan Reich, Macomb, MI (US); Lauren M. Peterson, Ann Arbor, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/510,688

(22) Filed: Feb. 23, 2000

Related U.S. Application Data

(60) Provisional application No. 60/120,652, filed on Feb. 24, 1999.

(51) Int. Cl.[7] .............................................. B60R 21/32
(52) U.S. Cl. ....................... 250/221; 280/735; 340/436; 180/273; 701/45
(58) Field of Search .......................... 250/221, DIG. 1, 250/239; 280/734, 735; 180/271, 273, 282; 340/436, 438, 555, 556, 557; 382/100, 104; 701/45

(56) References Cited

U.S. PATENT DOCUMENTS 4,931,767 A   6/1990   Albrecht et al.
5,071,160 A   12/1991  White (List continued on next page.)

FOREIGN PATENT DOCUMENTS

DE   3809074       3/1992
DE   3809074 C2    3/1998

(List continued on next page.)

OTHER PUBLICATIONS

Research Disclosure, Jul., 1997, No. 399.
Occupant Detection Systems—Reprinted from Anthropomorphic Dummies and Crash Instrumentation Sensors—1997 Society of Automotive Engineers, Inc., No. 971047, Feb. 24, 1997.

(List continued on next page.)

Primary Examiner—Kevin Pyo

(57) ABSTRACT

A vehicle occupant sensing system includes a laser array that generates three beams. A first beam is directed toward an upper body zone, a second beam is directed toward a middle body zone, and a third beam is directed toward a lower body zone. A first sensor assembly receives reflection beams from the upper body zone and generates a first signal that represents a proportional amount of an occupant present in the upper body zone. A second sensor assembly receives reflection beams from the middle body zone and generates a second signal that represents a proportional amount of the occupant present in the middle body zone. A third sensor assembly receives reflection beams from the lower body zone and generates a third signal that represents a proportional amount of the occupant present in the lower body zone. The laser array and the first, second, and third sensor assemblies are all mounted within a common housing that is mounted to a vehicle structure such as an A-pillar or rear view mirror. A central processor receives the first, second, and third signals and combines the signals to generate a control signal representative of the position of the occupant within the vehicle. The control signal is used to control deployment of an airbag based on the position of the occupant within the vehicle.

25 Claims, 5 Drawing Sheets

U.S. PATENT DOCUMENTS

| | | | |
|---|---|---|---|
| 5,232,243 | A | 8/1993 | Blackburn |
| 5,413,378 | A | 5/1995 | Steffens |
| 5,454,591 | A | 10/1995 | Mazor |
| 5,528,698 | A | 6/1996 | Kamei et al. |
| 5,585,625 | A | 12/1996 | Spies |
| 5,626,359 | A | 5/1997 | Steffens |
| 5,670,853 | A | 9/1997 | Bauer |
| 5,678,854 | A | 10/1997 | Meister |
| 5,835,613 | A | 11/1998 | Breed et al. |
| 5,906,393 | A | 5/1999 | Mazur |
| 6,324,453 | B1 * 11/2001 | Breed et al. ............... 382/104 |

FOREIGN PATENT DOCUMENTS

| | | |
|---|---|---|
| DE | 197 41 393 A | 3/1998 |
| DE | 198 33 207 A | 2/2000 |
| EP | 0734921 | 10/1996 |
| GB | 2236419 | 4/1991 |
| WO | WO98/17508 | 4/1998 |

OTHER PUBLICATIONS

Sensing Automobile Occupant Position with Optical Triangulation—Walt Chapelle, Optical Engineering Corp., and Ed Gills, Automotive Systems Laboratory, Inc.—Sensor Dec. 1995.

International Search Report completed Jul. 14, 2000.

* cited by examiner

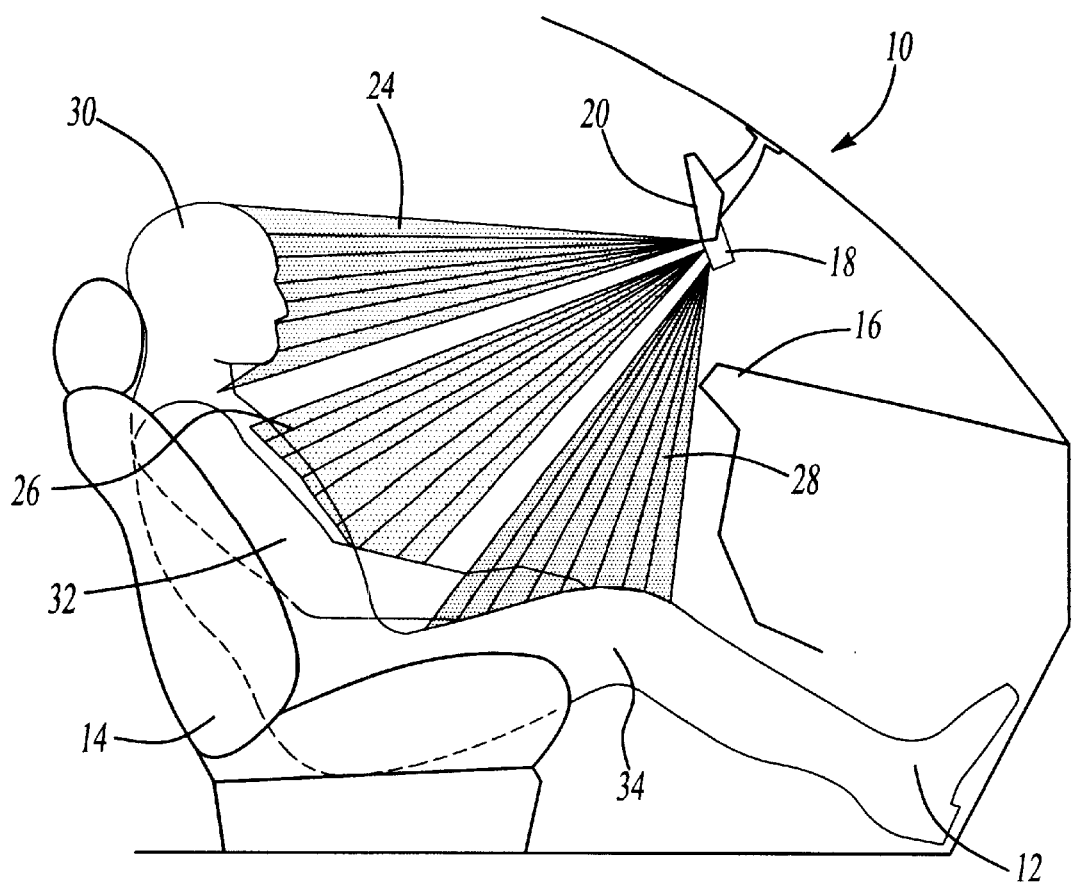
Fig-1
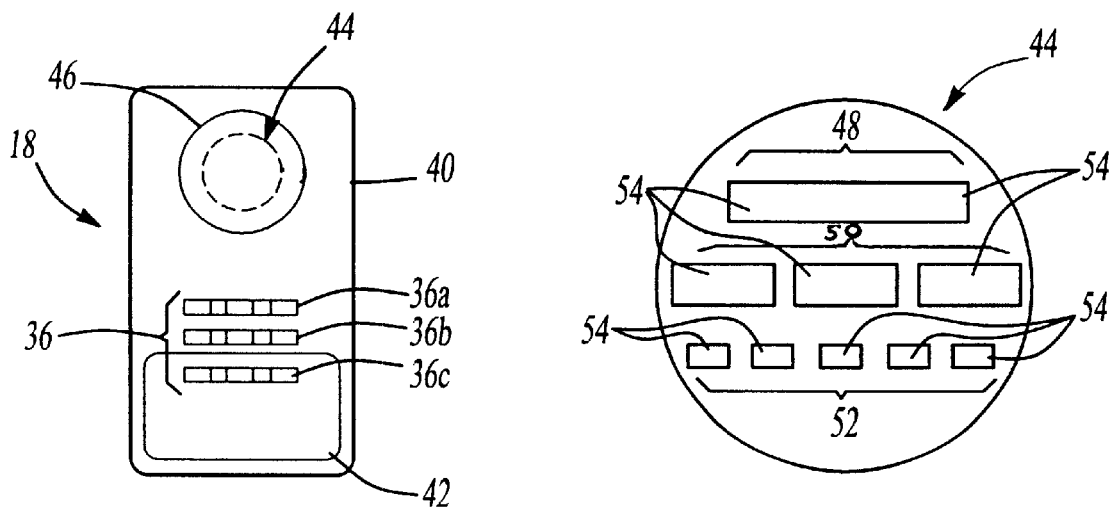
Fig-2
Fig-3

VEHICLE OCCUPANT SENSING SYSTEM

RELATED APPLICATION

This application claims priority to provisional application No. 60/120,652 filed on Feb. 24, 1999.

BACKGROUND OF THE INVENTION

1. Field of the Invention

This invention relates to a unique method and system for sensing position of an occupant within a vehicle where laser and sensor assemblies continuously monitor occupant position in three different zones.

2. Related Art

Many vehicles have airbag systems that are used to restrain occupants within a vehicle under certain deceleration requirements. If the vehicle decelerates suddenly, such as when a collision occurs, occupants will tend to continue to move forward due to inertial effects. An airbag is deployed under these circumstances to decelerate the occupants' impact speed before they contact a vehicle structure, such as a steering wheel or dashboard. The deployment of the airbag decreases the likelihood of serious injury for the occupants.

If vehicle occupants are positioned too close to the airbag, it may be desirable to decrease the deployment force of the airbag or to prohibit deployment of the airbag to prevent injury to the passenger from the impact of the airbag. Occupant sensing systems are used to provide information to optimize or suppress deployment of an airbag if an occupant is determined to be too close to the airbag. Some systems use sensors to determine when a seat belt has been withdrawn from the retraction reel beyond normal operative requirements. Other systems use optical or acoustic signals that are transmitted laterally across the vehicle extending parallel to the dashboard to determine proximity of an occupant to the dashboard. Other systems use transmitting/receiving sensors directed toward a vehicle dash to determine when an occupant is adjacent to or touching the dash.

These systems are complex and expensive. Often these complicated systems are difficult and time consuming to install and provide inaccurate position measurements. Thus, it is desirable to provide a simplified method and system for sensing position of an occupant within a vehicle that is easily installed and maintained. The simplified system should be compact and provide continuous and accurate readings for occupant position that are used to optimize or suppress deployment of an airbag if an occupant is determined to be too close to the airbag.

SUMMARY OF THE INVENTION

In a disclosed embodiment of this invention, a vehicle occupant sensing system includes a laser array and three sensor assemblies. The laser array is mounted to a vehicle structure and generates a first beam directed toward a first occupant zone, a second beam directed toward a second occupant zone, and a third beam directed toward a third occupant zone. The first sensor assembly receives reflection beams resulting from the first beam striking a first portion of an occupant located in the first zone. The first sensor assembly generates a first signal proportionally representing the amount of the occupant present in the first zone. The second sensor assembly receives reflection beams resulting from the second beam striking a second portion of the occupant located in the second zone. The second sensor assembly generates a second signal proportionally representing the amount of the occupant present in the second zone. The third sensor assembly for receives reflection beams resulting from the third beam hitting a third portion of the occupant located in the third zone. The third sensor assembly generates a third signal proportionally representing the amount of the occupant present in the third zone. A central processor is used to receive and combine the first, second, and third signals to determine the position of the occupant within the vehicle.

In a preferred embodiment, the laser array and sensor assemblies are all enclosed within a common housing that is mounted to a vehicle structure. A lens is installed within the housing to control the size, shape, and direction of the laser beams. Preferably, the first zone is defined as an area normally occupied by an upper portion of the occupant, the second zone is defined as an area normally occupied by a middle portion of the occupant, and the third zone is defined as an area normally occupied by a lower portion of the occupant. The lens directs the first beam to the first zone, the second beam to the second zone, and the third beam to the third zone.

In a further preferred embodiment, each beam forms a light curtain that is at least forty degrees wide and at least three degrees thick, with each beam being spaced apart from one another by at least ten degrees. Position of the occupant is continuously monitored as the sensor assemblies receive reflections resulting from the light curtains striking an occupant seated within the vehicle.

A method for sensing an occupant position within a vehicle includes the steps of generating a first laser beam toward a first zone, receiving a reflection from the first laser beam when the first laser beam strikes a portion of an occupant in the first zone, and generating a first signal representing a first proportional amount of the occupant in the first zone. Further steps include generating a second laser beam toward a second zone, receiving a reflection from the second laser beam when the second laser beam strikes a portion of an occupant in the second zone, and generating a second signal representing a second proportional amount of the occupant in the second zone. Additional steps include generating a third laser beam toward a third zone, receiving a reflection from the third laser beam when the third laser beam strikes a portion of an occupant in the third zone, and generating a third signal representing a third proportional amount of the occupant in the third zone. The first, second, and third signals are combine to determine occupant position within the vehicle. The first, second, and third signals can be used to generate a control signal for controlling the deployment of an airbag based on occupant position within the vehicle.

These and other features of the present invention can be best understood from the following specification and drawings, the following of which is a brief description.

BRIEF DESCRIPTION OF THE DRAWINGS

FIG. 1 is a side schematic view of one embodiment of the subject occupant sensing system mounted within a vehicle.

FIG. 2 is a schematic view of the occupant sensing system.

FIG. 3 is a magnified schematic view of a sensor array as used in the subject occupant sensing system.

DETAILED DESCRIPTION OF AN EXEMPLARY EMBODIMENT

Figure 4:
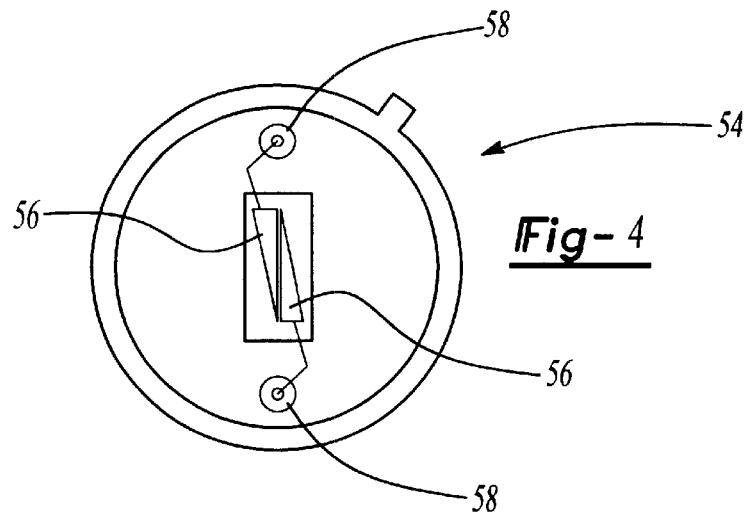
FIG. 4 is a magnified view of a sensor unit.

A vehicle is shown generally at 10 in FIG. 1. The vehicle 10 includes an occupant sensing system that continuously monitors the position of an occupant 12 within a vehicle 10 and provides occupant position information to control an airbag system based on position of the occupant 12 within the vehicle 10. Typically, the sensing system monitors the position of the occupant 12 when they are seated within the vehicle 10 on a vehicle seat 14. However, the system can also monitor the position of an occupant 12 located between the seat 14 and a vehicle dash 16, i.e., a child standing-up between the dash 16 and the seat 14.

The occupant sensing system includes a sensor unit 18 that is mounted to a vehicle structure. Preferably the sensor unit 18 is mounted at a relatively high vertical position within in the vehicle, such as by the rear-view mirror 20 as shown in FIG. 1. Instead of being centrally mounted, the unit 18 can be optionally mounted near the side of the vehicle 10 on an A-pillar, for example.

The sensor unit 18 generates at least three (3) laser beams 24, 26, 28 that are directed toward the area within the vehicle in which the occupant 12 will be seated. The first beam 24 is directed toward a first occupant zone 30, the second beam 26 is directed toward a second occupant zone 32, and the third beam 28 is directed toward a third occupant zone 34, as generally indicated in FIG. 1. Preferably, the first zone 30 is defined as an area normally occupied by an upper portion of the occupant 12, the second zone 32 is defined as an area normally occupied by a middle portion of the occupant 12, and the third zone 34 is defined as an area normally occupied by a lower portion of the occupant 12.

The sensor unit 18 includes a laser array, shown generally at 36 in FIG. 2, that is comprised of at least three laser elements 36a, 36b, 36c. The first laser element 36a generates the first beam 24, the second laser element 36b generates the second beam 26, and the third laser element 36c generates the third beam 28. The laser 36 can be any type of laser known in the art, but is preferably a diode laser that includes a light emitting diode for the infrared band. An example of such a laser is the PGA series laser manufactured by EG&G Canada. The laser 36 is mounted within a housing 40 that is mounted to the A-pillar or rear-view mirror 20.

A first lens 42 is mounted within the housing 40 and is positioned in front of the laser array 36 to control the size and shape of the first 24, second 26, and third 28 beams. The lens 42 also is used to direct the first beam 24 to the first zone 30, the second beam 26 to the second zone 32, and the third beam 28 to the third zone 34.

When the beams 24, 26, 28 strike a target, i.e., an occupant seated in the seat 14, the beams 24, 26, 28 are reflected back toward the sensor unit 18. A sensor array, shown generally at 44 in FIG. 2, is mounted within the housing 40 for receiving the reflected beams. A second lens 46 is mounted adjacent to the sensor array 44 to control the direction and focus of the reflection beams. Both lenses are preferably plastic and may or may not include a coating for filtering out light from the sun. The first lens 42 is preferably a cylindrical lens and the second lens is preferably a circular lens that are made by EG&G Canada. The use of a cylindrical lens reduces slow divergence while leaving fast divergence unaffected. The circular lens is slightly curved to reflect distortions in the reflection beams as they return to the unit 18.

The sensor array 44 is shown in greater detail in FIG. 3. The sensor array 44 includes a first sensor assembly 48 for receiving reflection beams resulting from the first beam 24 hitting a first portion of an occupant 12 located in the first zone 30. A second sensor assembly 50 receives reflection beams resulting from the second beam 26 hitting a second portion of the occupant 12 located in the second zone 32. A third sensor assembly 52 receives reflection beams resulting from the third beam 28 hitting a third portion of the occupant 12 located in the third zone 34.

The first sensor assembly 48 generates a first signal $S_{Z1}$ proportionally representing the first portion of the occupant 12 present in the first zone 30. The second sensor assembly 50 generates a second signal $S_{Z2}$ proportionally representing the second portion of the occupant 12 present in the second zone 32. The third sensor assembly 52 generates a third signal $S_{Z3}$ proportionally representing the third portion of the occupant 12 present in the third zone 34. These signals are combined to determine the occupant position within the vehicle.

The first sensor assembly 48 includes at least one (1) sensor unit 54 that receives the reflection beams from the first zone 30. The second sensor assembly 50 includes at least three (3) sensor units 54 for receiving the reflection beams from the second zone 32 and the third sensor assembly 52 includes at least five (5) sensor units 54 for receiving the reflection beams from the third zone 34.

Figure 6:
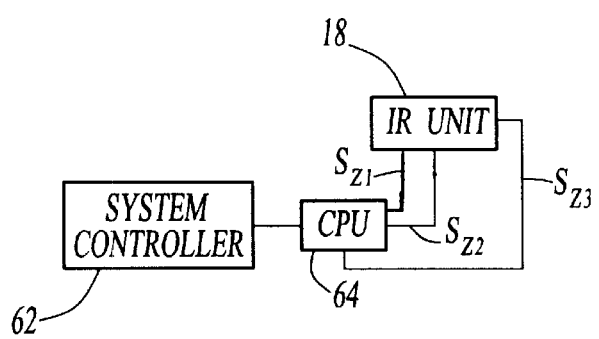
FIG. 6 is a schematic view of the airbag and occupant sensing control systems.

Each of the sensor units 54 is comprised of two (2) triangular sensors 56 mounted adjacent to each other to form a parallelogram, as shown in FIG. 4. Each sensor 56 is connected to an anode 58 and works in combination with the sensors 56 for each of the sensor assemblies 48, 50, 52 to generate a control signal representative of the occupant's position within the vehicle. The control signal is used to provide continuous and accurate readings for occupant position that are used to optimize or suppress deployment of an airbag 60 if an occupant is determined to be too close to the airbag, see FIG. 6.

Figure 5:
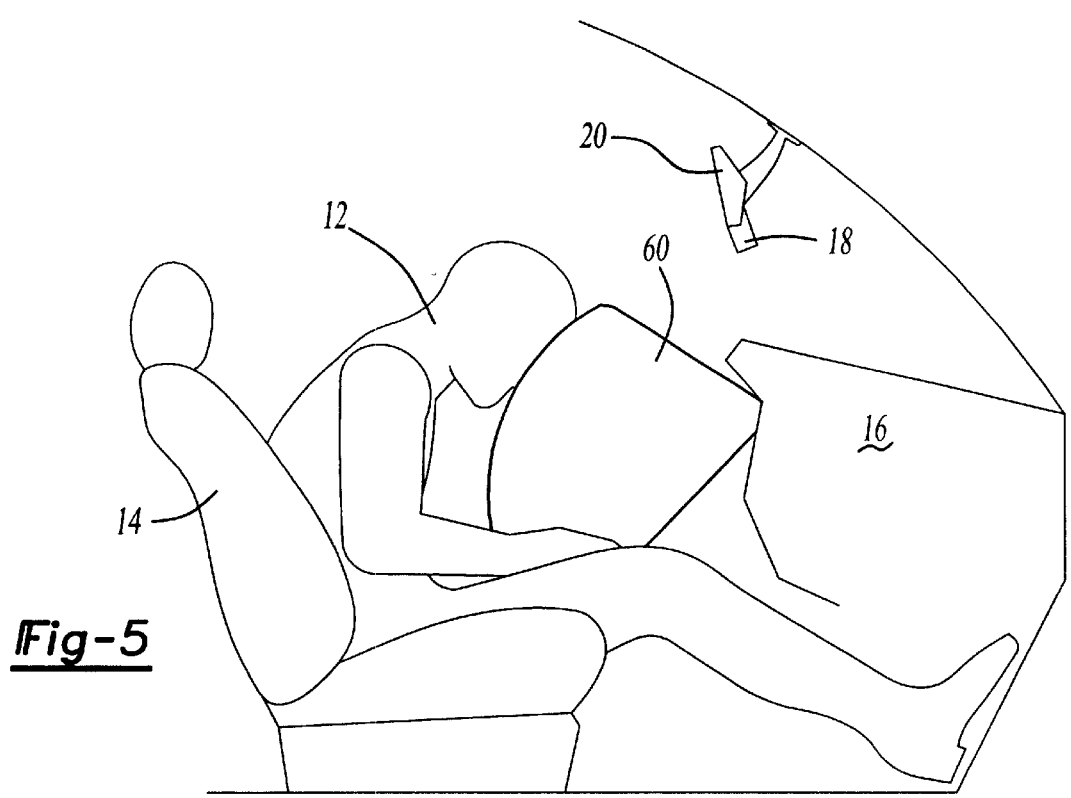
FIG. 5 is a side schematic view of a vehicle with an airbag in the deployed position.

The airbag 60 is connected to a system controller 62 as is well known in the art, see FIG. 5. As discussed above, the sensor assemblies 48, 50, 52 generate signals $S_{Z1}$, $S_{Z2}$, $S_{Z3}$ which are representative of a portion of an occupant 12 in the respective zones 30, 32, 34. The signals $S_{Z1}$, $S_{Z2}$, $S_{Z3}$ are sent to a central processing unit (CPU) 64 that generates the control signal, which is then sent to the system controller 62, see FIG. 6. The controller 62 controls deployment and/or suppression of the airbag 60 based on the position of the occupant 12 within the vehicle 10.

The sensor unit 18 is a very compact assembly that requires very little space within the vehicle 10 because the laser array 36 and the sensor assemblies 48, 50, 52 are all mounted within the same housing 40. This housing 40 is easily installed within the vehicle 10 and is easily connected to the CPU 64 as is known in the art.

Figure 7:
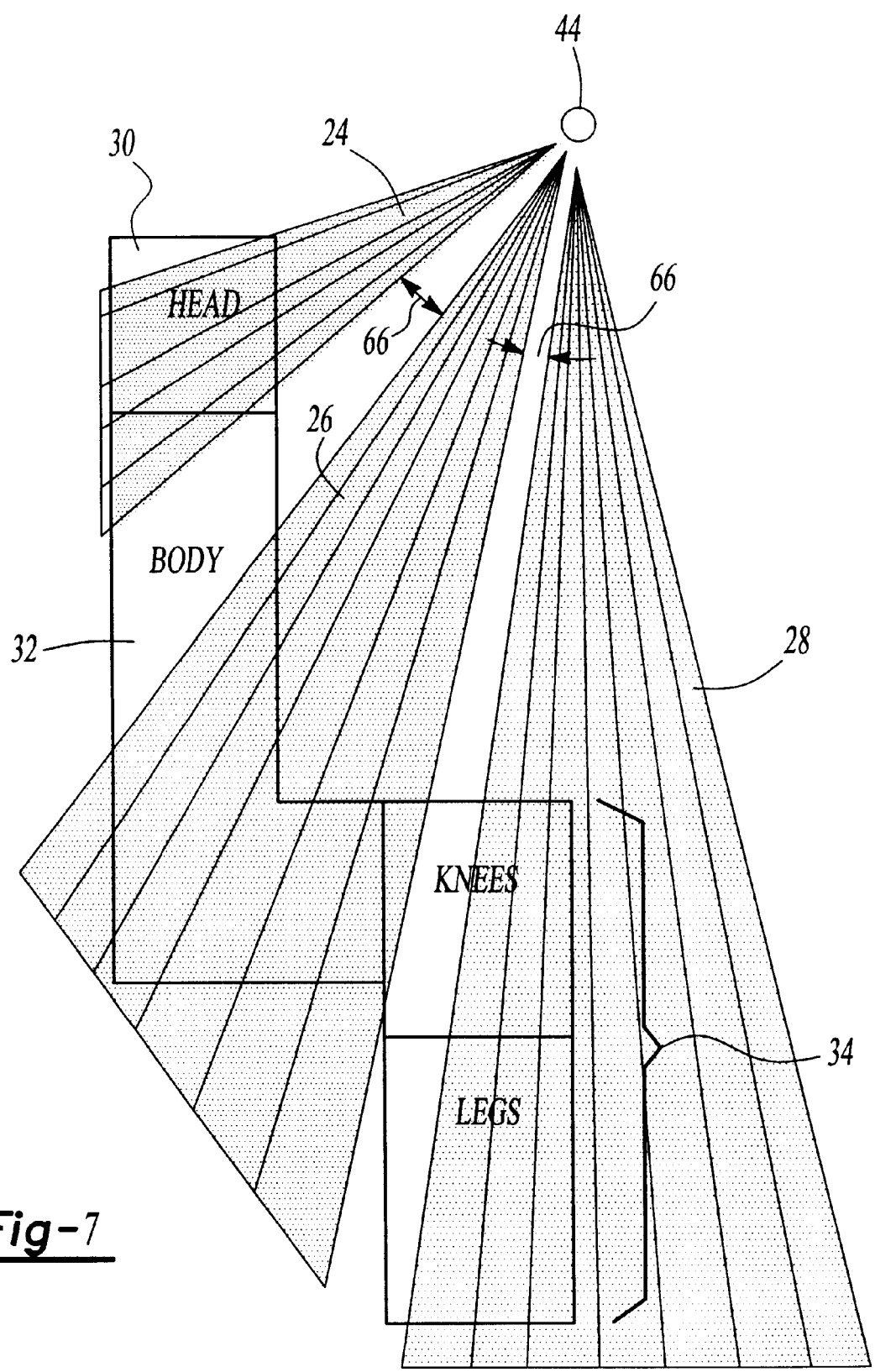
FIG. 7 is a side schematic view of the orientation of the laser beams and corresponding body zones.

The sensor unit 18 is preferably orientated within the vehicle to monitor the passenger side of the vehicle, however, the unit 18 could be reconfigured to monitor the driver's position within the vehicle 10. Each of the laser beams 24, 26, 28 generates a light curtain that is directed toward the appropriate zone 30, 32, 34. In order to ensure adequate coverage of the passenger seat area, the light curtains are preferably at least forty degrees (40°) wide, i.e. extends forty degrees laterally (left-to-right) across the passenger seat and at least three degrees (3°) thick. Additionally, the first 24, second 26, and third 28 beams are spaced apart from one another by at least ten degrees (10°) as indicated by arrow 66, see FIG. 7. Optimally, the laser light curtains should be able to cover an area of one meter (1 m) by sixty-five centimeters (65 cm).

Figure 8:
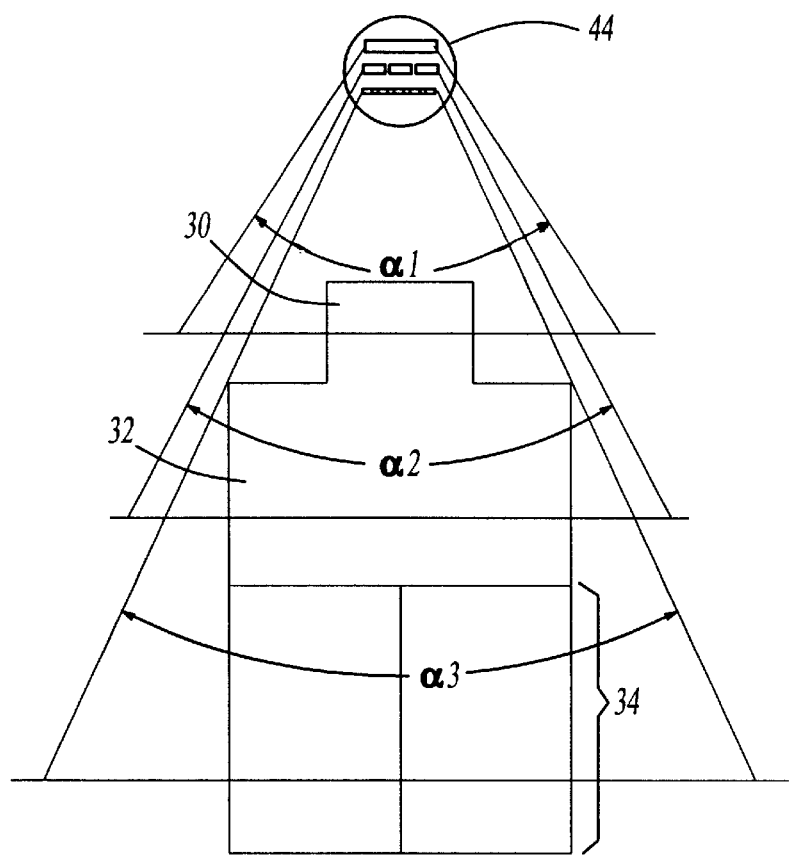
FIG. 8 is a front schematic view of the orientation of the reflection beams and corresponding body zones.
Figure 9:
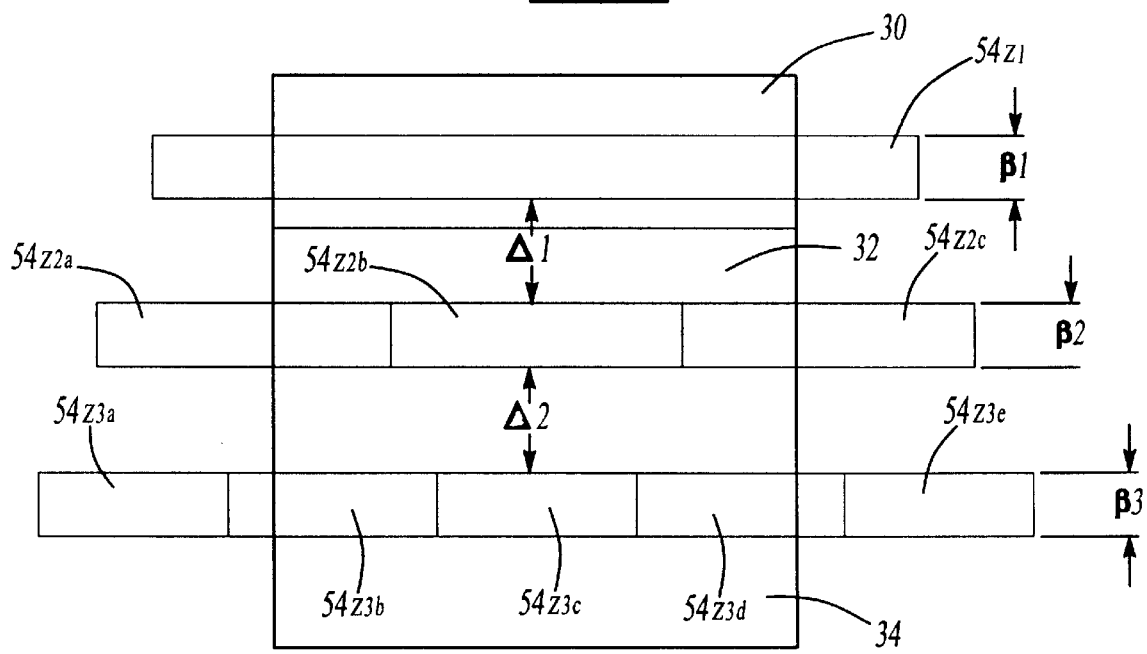
FIG. 9 is a top schematic view of the orientation of the sensor units with regard to the body zones.

As discussed above, the occupant sensing assembly 18 includes a different number of sensor units 54 for each zone 30, 32, 34. As shown in FIGS. 8 and 9, the sensor array 44 includes one (1) sensor unit $54_{Z1}$ in the upper body zone 30, three (3) sensor units $54_{Z2a-c}$ in the middle body zone 32, and five (5) sensor units $54_{Z3a-e}$ in the lower body zone 34 with all sensors 54 configured in a single chip. Preferably, the sensors 54 in each zone 30, 32, 34 emit forty degree fan shaped beams $\alpha_{1-3}$, shown in FIG. 8. The beams are also preferably three degrees thick $\beta_{1-3}$ and are spaced ten degrees $\Delta_{1-2}$ apart from one another, as shown in FIG. 9. While this is the preferred configuration, it should be understood that other configurations would work as well.

Only one sensor unit $54_{Z1}$ is preferred for the upper body zone 30 because this zone is the furthest longitudinal distance away from the dashboard 16. The lower body zone 34 requires more sensors $54_{Z3a-e}$ because this zone 34 is the closest to the dashboard 16 and requires close monitoring.

A method for sensing an occupant position within a vehicle includes the steps of generating a first laser beam 24 toward a first zone 30, receiving a reflection from the first laser beam 24 when the first laser beam 24 strikes a portion of an occupant 12 in the first zone 30, and generating a first signal $S_{z1}$ representing a first proportional amount of the occupant 12 in the first zone 30. Further steps include generating a second laser beam 26 toward a second zone 32, receiving a reflection from the second laser beam 26 when the second laser beam 26 strikes a portion of an occupant 12 in the second zone 32, and generating a second signal $S_{z2}$ representing a second proportional amount of the occupant 12 in the second zone 32. Additional steps include generating a third laser beam 28 toward a third zone 34, receiving a reflection from the third laser beam 28 when the third laser beam 28 strikes a portion of an occupant 12 in the third zone 34, and generating a third signal $S_{z3}$ representing a third proportional amount of the occupant 12 in the third zone 34. The first, second, and third signals are combine to determine occupant position within the vehicle. The first, second, and third signals $S_{z1}$, $S_{z2}$, $S_{z3}$ can be used to generate a control signal for controlling the deployment of an airbag 60 based on occupant position within the vehicle 10.

Additional steps include spacing the first, second, and third laser beams 24, 26, 28 at least ten degrees apart from one another having each laser beam generate a curtain of light being at least forty degrees wide and three degrees thick. The generating of the laser beams and the receipt of reflections via sensor assemblies 48, 50, 52 provide continuous monitoring of the position of the occupant 12 within the vehicle 10.

The laser array 36 is powered to transmit laser beams toward a target. The beams are reflected back to the sensor array 44. The power received Pr from the reflections can be calculated based on the initial power transmitted Pt. The power received Pr can be calculated based on the following equation:

$$Pr=Pt(Atc/Ab)(Aa/\Pi r^2)(\rho T)$$

where Pt is the power transmitted, Atc is the area of the target captured, Ab is the area of the beam, Aa is the area of the aperture, R, is the distance from the source to the target, ρ is the reflection efficiency, and T is the filter efficiency. The ratio of the area of the target captured Atc to the area of the beam Ab (Atc/Ab) is equal to the efficiency of the beam hitting the target, which is approximately ten percent (10%). The reflection efficiency ρ is ninety percent (90%) for white and three percent (3%) for black. The filter efficiency T is approximately fifty percent (50%). The ratio of the aperture area Aa to the distance from the source to the target R times pi $\Pi(Aa/\Pi r^2)$ is approximately equal to $10^{-4}$ for 1 meter, which is equal to the efficiency of the reflected beam. Thus, $Pr=Pt(0.1)(0.03)(0.5)(10^{-4})$ for black, i.e. $Pr=Pt(1.56e^{-6})$.

Figure 10:
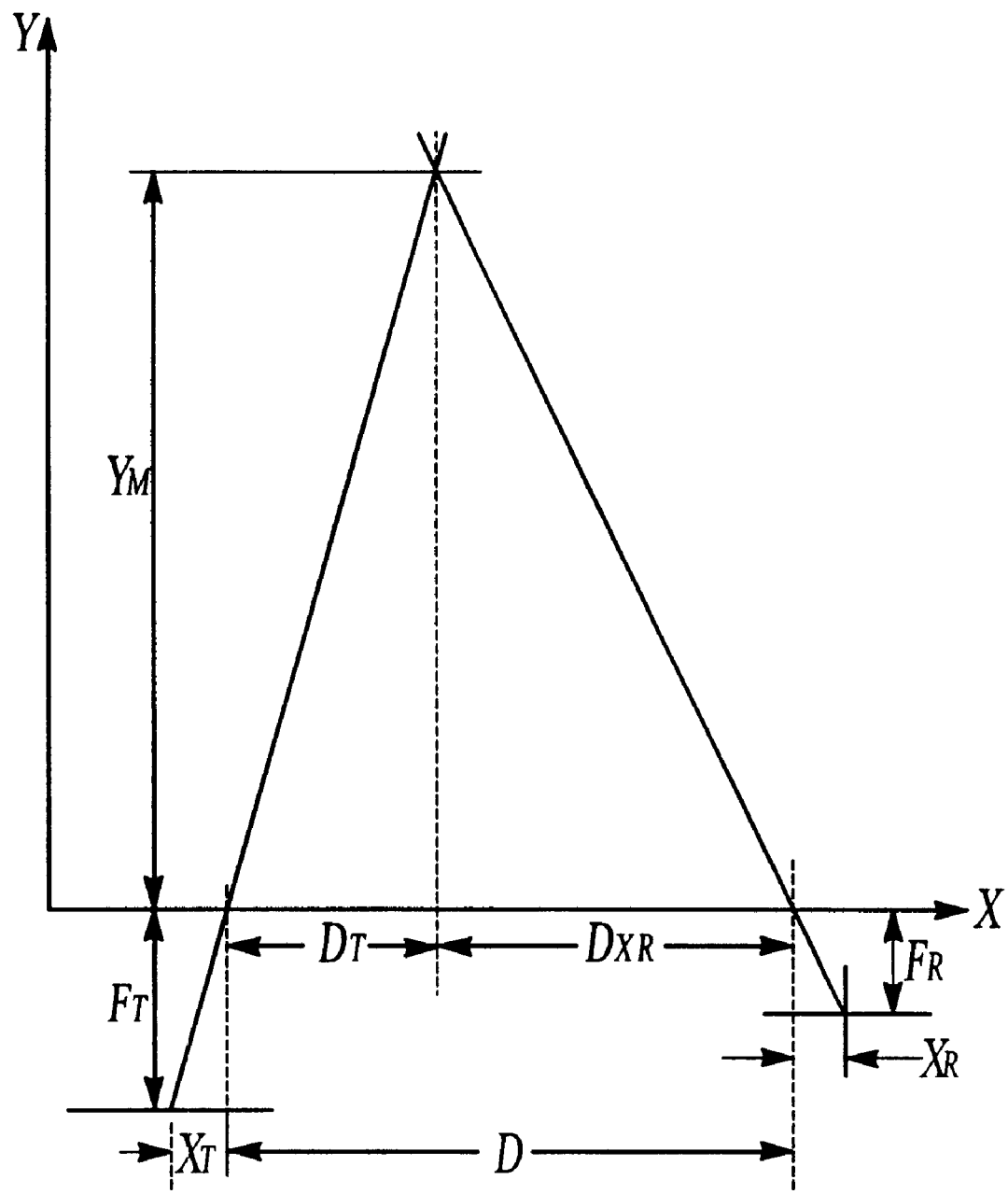
FIG. 10 is a graph depicting the triangulation method used to determine occupant position.

The occupant position is determined using standard triangulation calculations as is known in the art. In reference to FIG. 10, D is the distance between the optical axis of the receiver and transmitter, Dxt is the distance between the optical axis of the transmitter and target, Dxr is the distance between the optical axis of the receiver and the target, Ft is the focal distance transmitter, Fr is the focal distance receiver, Ym is the distance between the system and target, Xt is the transmitter distance from the optical axis, and Xr is the receiver distance from the optical axis (detected shift). The receiver distance from the optical axis Xr is determined from the following equation:

$$Xr=((D/Ym)-(Xt/Ft))*Fr$$

This equation is derived from the following relationships:

$$Dxt=((Xt*Ym)/Ft)$$

and $$Dxr=((Xr*Ym)/Fr).$$

To determine the distance between the optical axis of the receiver and transmitter D, the distance between the optical axis of the transmitter and target Dxt is added to the distance between the optical axis of the receiver and the target Dxr as follows: $D=Dxr+Dxt=Ym*((Xr/Fr)+(Xt/Ft))$. Thus, the receiver distance from the optical axis Xr is easily solved: $Xr=((D/Ym)-(Xt/Ft))*Fr$.

The subject unique method and system for sensing position of an occupant within a vehicle provides a simplified system that is easily installed and maintained. The subject system also requires relatively few components and is compact. This simplified system provides continuous and accurate readings for occupant position that are used to optimize or suppress deployment of an airbag if an occupant is determined to be too close to the airbag.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A vehicle occupant sensing system comprising:
a single laser array mounted to a vehicle structure for generating a first beam directed toward a first occupant zone, a second beam directed toward a second occupant zone, and a third beam directed toward a third occupant zone with said first, second and third beams all being generated from generally the same location on said vehicle structure;

a first sensor assembly for receiving reflection beams resulting from said first beam hitting a first portion of an occupant located in said first zone, said first sensor assembly generating a first signal proportionally representing said first portion of the occupant present in said first zone;

a second sensor assembly for receiving reflection beams resulting from said second beam hitting a second portion of the occupant located in said second zone, said second sensor assembly generating a second signal proportionally representing said second portion of the occupant present in said second zone;

a third sensor assembly for receiving reflection beams resulting from said third beam hitting a third portion of the occupant located in said third zone, said third sensor assembly generating a third signal proportionally representing said third portion of the occupant present in said third zone; and a central processor for receiving said first, second, and third signals and combining said signals to determine the position of the occupant within the vehicle.

2. A system according to claim 1 wherein said first zone is defined as an area normally occupied by an upper portion of the occupant, said second zone is defined as an area normally occupied by a middle portion of the occupant, and said third zone is defined as an area normally occupied by a lower portion of the occupant.

3. A vehicle occupant sensing system comprising:

a laser array mounted to a vehicle structure for generating a first beam directed toward a first occupant zone, a second beam directed toward a second occupant zone, and a third beam directed toward a third occupant zone;

a first sensor assembly for receiving reflection beams resulting from said first beam hitting a first portion of an occupant located in said first zone, said first sensor assembly generating a first signal proportionally representing said first portion of the occupant present in said first zone;

a second sensor assembly for receiving reflection beams resulting from said second beam hitting a second portion of the occupant located in said second zone, said second sensor assembly generating a second signal proportionally representing said second portion of the occupant present in said second zone;

a third sensor assembly for receiving reflection beams resulting from said third beam hitting a third portion of the occupant located in said third zone, said third sensor assembly generating a third signal proportionally representing said third portion of the occupant present in said third zone wherein said laser array and said first, second, and third sensor assemblies are mounted within a common housing; and a central processor for receiving said first, second, and third signals and combining said signals to determine the position of the occupant within the vehicle.

4. A system according to claim 3 wherein said housing is mounted to a vehicle side member.

5. A system according to claim 3 wherein said housing is centrally mounted within the vehicle.

6. A system according to claim 3 wherein said laser array is comprised of a first laser element for generating said first beam, a second laser element for generating said second beam, and a third laser element for generating said third beam, said first, second, and third laser elements each being mounted with said common housing.

7. A system according to claim 6 including a lens mounted within said housing for controlling size and shape of said first, second, and third beams and for directing said first beam to said first zone, said second beam to said second zone, and said third beam to said third zone.

8. A system according to claim 7 wherein said first sensor assembly includes at least one sensor unit for receiving said reflection beams from said first zone, said second sensor assembly includes at least three sensor units for receiving said reflection beams from said second zone, and said third sensor assembly includes at least five sensor units for receiving said reflection beams from said third zone.

9. A system according to claim 8 wherein each of said sensor units is comprised of two triangular sensors mounted adjacent to each other to form a parallelogram.

10. A system according to claim 1 including an airbag system wherein said processor generates a control signal for controlling deployment of an airbag based on the position of the occupant within the vehicle.

11. A system according to claim 1 wherein each of said first, second, and third beams are at least forty degrees wide and at least three degrees thick.

12. A system according to claim 1 wherein each of said first, second, and third beams are spaced apart from one another by at least 10 degrees.

13. A vehicle occupant sensing system comprising:

a housing mounted to a vehicle structure;

a laser array mounted within said housing for generating a first beam directed toward an upper zone, a second beam directed toward a middle zone, and a third beam directed toward a lower zone;

a first sensor assembly for receiving reflection beams from said upper zone, said first sensor assembly generating a first signal proportionally representing a first portion of an occupant present in said upper zone;

a second sensor assembly for receiving reflection beams from said middle zone, said second sensor assembly generating a second signal proportionally representing a second portion of the occupant present in said middle zone;

a third sensor assembly for receiving reflection beams from said lower zone, said third sensor assembly generating a third signal proportionally representing a third portion of the occupant present in said lower zone wherein said first, second, and third sensor assemblies are mounted within said housing;

a central processor for receiving said first, second, and third signals and combining said signals to generate a control signal representative of the position of the occupant within the vehicle an airbag system for receiving said control signal such that deployment of an airbag is varied depending on the position of the occupant within the vehicle.

14. A system according to claim 13 wherein each of said first, second, and third beams are at least forty degrees wide and at least three degrees thick.

15. A system according to claim 14 wherein each of said first, second, and third beams are spaced apart from one another by at least 10 degrees.

16. A system according to claim 15 including a lens mounted within said housing for controlling size and shape of said first, second, and third beams and for directing said first beam to said upper zone, said second beam to said middle zone, and said third beam to said lower zone.

17. A method for sensing an occupant position within a vehicle comprising the steps of:

generating a first laser beam from a first position in the vehicle toward a first zone;

generating a second laser beam from the first position toward a second zone;

generating a third laser beam from the first position toward a third zone;

receiving a reflection from the first laser beam when the first laser beam strikes a portion of an occupant in the first zone;

generating a first signal representing a first proportional amount of the occupant in the first zone;

receiving a reflection from the second laser beam when the second laser beam strikes a portion of an occupant in the second zone;

generating a second signal representing a second proportional amount of the occupant in the second zone;

receiving a reflection from the third laser beam when the third laser beam strikes a portion of an occupant in the third zone;

generating a third signal representing a third proportional amount of the occupant in the third zone; and combining the first, second, and third signals to determine occupant position within the vehicle.

18. A method according to claim 17 including the step of generating a control signal representing occupant position within the vehicle and controlling deployment of an airbag based on the control signal.

19. A method according to claim 18 including the step of spacing the first, second, and third laser beams at least ten degrees apart from one another.

20. A method according to claim 19 including the step of each laser beam generating a curtain of light being at least forty degrees wide and three degrees thick.

21. A system according to claim 1 wherein said vehicle structure comprises an upper vehicle structure and said first, second and third beams are all generated from a location generally in front of the occupant.

22. A system according to claim 13 wherein said first, second and third beams are all generated from generally the same location on said vehicle structure.

23. A system according to claim 22 wherein said laser array and said first, second, and third sensor assemblies are mounted within said housing.

24. A method according to claim 17 wherein the first position is a location generally in front of the occupant.

25. A method according to claim 24 further including the step of generating the first, second and third laser beams from a single laser array enclosed within a housing mounted within the vehicle at the first position.

* * * * *